United States Patent [19]
Dodson

[11] Patent Number: 5,778,769
[45] Date of Patent: Jul. 14, 1998

[54] RICE RINSING SYSTEM

[76] Inventor: Albert A. Dodson, #8-2023 Winfield Drive, Abbotsford, British Columbia, Canada, V3G 1K5

[21] Appl. No.: 941,136

[22] Filed: Sep. 30, 1997

[51] Int. Cl.[6] .................. A47J 43/04; B01D 33/00; B08B 3/04; F26B 17/24
[52] U.S. Cl. .................. 99/536; 99/495; 99/511; 99/513; 134/149; 134/157; 134/162; 210/380.1; 366/226; 366/234
[58] Field of Search .................. 99/495, 511–513, 99/536, 516, 534; 137/157, 158, 198, 200, 149, 162; 210/360.1, 380.1, 474, 477; 366/224–226, 230, 234

[56] References Cited

U.S. PATENT DOCUMENTS

| | | | |
|---|---|---|---|
| 2,376,627 | 5/1945 | Seiple | 134/162 |
| 2,633,140 | 3/1953 | Wagner | 366/226 |
| 4,007,751 | 2/1977 | Commiant | 134/158 |
| 4,090,310 | 5/1978 | Koff | 99/511 |
| 4,209,916 | 7/1980 | Doyel | 99/495 X |
| 4,350,087 | 9/1982 | Ramirez | 99/513 |
| 4,702,162 | 10/1987 | Sontheimer et al. | 210/360.1 |
| 4,809,723 | 3/1989 | Mieliconi | 99/536 |
| 5,064,535 | 11/1991 | Hsu | 210/380.1 |
| 5,156,084 | 10/1992 | Lin | 99/495 |
| 5,184,544 | 2/1993 | Ling | 99/536 |
| 5,317,964 | 6/1994 | Prudhomme | 99/511 |
| 5,562,025 | 10/1996 | Bull et al. | 99/495 |

*Primary Examiner*—Timothy F. Simone

[57] ABSTRACT

A new rice rinsing system for cleaning natural grown rice without having to get hands wet. The inventive device includes a cylindrical water bowl having an open upper end, a closed lower end and a cylindrical side wall therebetween. A cylindrical shaft extends upwardly from the closed lower end. A cylindrical rice holder is provided having an open upper end, a closed lower end and a cylindrical side wall therebetween. The closed lower end and the cylindrical side wall of the rice holder are perforated. A hollow cylindrical sleeve extends upwardly from the closed lower end of the rice holder. The cylindrical sleeve has an open lower end for receiving the cylindrical shaft of the water bowl therein when the rice holder is positioned within the water bowl. A water bowl lid is dimensioned for covering the open upper end of the water bowl. The water bowl lid has a centrally disposed aperture therethrough with a cylindrical collar extending upwardly therefrom. A cylindrical spindle is provided having an upper end and a lower end. The lower end of the spindle is received through the centrally disposed aperture of the water lid and engages the cylindrical sleeve of the rice holder. An elongated handle engages the upper end of the cylindrical spindle.

6 Claims, 2 Drawing Sheets

RICE RINSING SYSTEM

BACKGROUND OF THE INVENTION

1. Field of the Invention

The present invention relates to vegetable cleaners and more particularly pertains to a new rice rinsing system for cleaning natural grown rice without having to get hands wet.

2. Description of the Prior Art

The use of vegetable cleaners is known in the prior art. more specifically, vegetable cleaners heretofore devised and utilized are known to consist basically of familiar, expected and obvious structural configurations, notwithstanding the myriad of designs encompassed by the crowded prior art which have been developed for the fulfillment of countless objectives and requirements.

Known prior art vegetable cleaners include U. S. Pat. No. 5,184,544 to Ling; U.S. Pat. No. 4,756,323 to Horton; U.S. Pat. No. Des. 328,551 to Kong; U.S. Pat. No. 5,064,535 to Hsu; U.S. Pat. No. 4,007,751 to Commiant; and U.S. Pat. No. 4,209,916 to Doyel.

While these devices fulfill their respective, particular objectives and requirements, the aforementioned patents do not disclose a new rice rinsing system. The inventive device includes a cylindrical water bowl having an open upper end, a closed lower end and a cylindrical side wall therebetween. A cylindrical shaft extends upwardly from the closed lower end. A cylindrical rice holder is provided having an open upper end, a closed lower end and a cylindrical side wall therebetween. The closed lower end and the cylindrical side wall of the rice holder are perforated. A hollow cylindrical sleeve extends upwardly from the closed lower end of the rice holder. The cylindrical sleeve has an open lower end for receiving the cylindrical shaft of the water bowl therein when the rice holder is positioned within the water bowl. A water bowl lid is dimensioned for covering the open upper end of the water bowl. The water bowl lid has a centrally disposed aperture therethrough with a cylindrical collar extending upwardly therefrom. A cylindrical spindle is provided having an upper end and a lower end. The lower end of the spindle is received through the centrally disposed aperture of the water lid and engages the cylindrical sleeve of the rice holder. An elongated handle engages the upper end of the cylindrical spindle.

In these respects, the rice rinsing system according to the present invention substantially departs from the conventional concepts and designs of the prior art, and in so doing provides an apparatus primarily developed for the purpose of cleaning natural grown rice without having to get hands wet.

SUMMARY OF THE INVENTION

In view of the foregoing disadvantages inherent in the known types of vegetable cleaners now present in the prior art, the present invention provides a new rice rinsing system construction wherein the same can be utilized for cleaning natural grown rice without having to get hands wet.

The general purpose of the present invention, which will be described subsequently in greater detail, is to provide a new rice rinsing system apparatus and method which has many of the advantages of the vegetable cleaners mentioned heretofore and many novel features that result in a new rice rinsing system which is not anticipated, rendered obvious, suggested, or even implied by any of the prior art vegetable cleaners, either alone or in any combination thereof.

To attain this, the present invention generally comprises a cylindrical water bowl having an open upper end, a closed lower end and a cylindrical side wall therebetween. The water bowl has female receiving grooves extending downwardly within the side wall from the open upper end. The closed lower end has a base secured to a central portion thereof within an interior of the water bowl. A cylindrical shaft extends upwardly from the base. A cylindrical rice holder is provided having an open upper end, a closed lower end and a cylindrical side wall therebetween. The closed lower end and the cylindrical side wall of the rice holder are perforated. A hollow cylindrical sleeve extends upwardly from the closed lower end of the rice holder. The cylindrical sleeve has an open lower end for receiving the cylindrical shaft of the water bowl therein when the rice holder is positioned within the water bowl. An upper end of the cylindrical sleeve has a lower square male fitting extending upwardly therefrom. A rice holder lid is dimensioned for covering the open upper end of the rice holder. The rice holder lid has an aperture through a central portion thereof in alignment with the cylindrical sleeve of the rice holder. A water bowl lid is dimensioned for covering the open upper end of the water bowl. The water bowl lid has a spout therethrough. The water bowl lid has male fasteners extending downwardly from a lower surface thereof for engaging the female receiving grooves of the water bowl. The water bowl lid has a centrally disposed aperture therethrough with a cylindrical collar extending upwardly therefrom. The aperture is in alignment with the aperture of the rice holder lid. A cylindrical spindle is provided having an upper end and a lower end. The lower end has a lower square female fitting extending upwardly thereof. The upper end has an upper square male fitting extending upwardly therefrom. The lower end of the spindle is received through the centrally disposed aperture of the water lid and through the aperture in the rice holder lid with the lower square female fitting engaging the lower square male fitting of the rice holder. An elongated handle is provided having a rotatable knob disposed on an upper surface of an outer end thereof. The handle has an upper square female fitting on a lower surface of an inner end thereof. The upper square female fitting engages the upper square male fitting of the cylindrical spindle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rice rinsing system apparatus and method which has many of the advantages of the vegetable cleaners mentioned heretofore and many novel features that result in a new rice rinsing system which is not anticipated, rendered obvious, suggested, or even implied by any of the prior art vegetable cleaners, either alone or in any combination thereof.

It is another object of the present invention to provide a new rice rinsing system which may be easily and efficiently manufactured and marketed.

It is a further object of the present invention to provide a new rice rinsing system which is of a durable and reliable construction.

An even further object of the present invention is to provide a new rice rinsing system which is susceptible of a low cost of manufacture with regard to both materials and labor, and which accordingly is then susceptible of low prices of sale to the consuming public, thereby making such rice rinsing system economically available to the buying public.

Still yet another object of the present invention is to provide a new rice rinsing system which provides in the apparatuses and methods of the prior art some of the advantages thereof, while simultaneously overcoming some of the disadvantages normally associated therewith.

Still another object of the present invention is to provide a new rice rinsing system for cleaning natural grown rice without having to get hands wet.

Yet another object of the present invention is to provide a new rice rinsing system which includes a cylindrical water bowl having an open upper end, a closed lower end and a cylindrical side wall therebetween. A cylindrical shaft extends upwardly from the closed lower end. A cylindrical rice holder is provided having an open upper end, a closed lower end and a cylindrical side wall therebetween. The closed lower end and the cylindrical side wall of the rice holder are perforated. A hollow cylindrical sleeve extends upwardly from the closed lower end of the rice holder. The cylindrical sleeve has an open lower end for receiving the cylindrical shaft of the water bowl therein when the rice holder is positioned within the water bowl. A water bowl lid is dimensioned for covering the open upper end of the water bowl. The water bowl lid has a centrally disposed aperture therethrough with a cylindrical collar extending upwardly therefrom. A cylindrical spindle is provided having an upper end and a lower end. The lower end of the spindle is received through the centrally disposed aperture of the water lid and engages the cylindrical sleeve of the rice holder. An elongated handle engages the upper end of the cylindrical spindle.

Still yet another object of the present invention is to provide a new rice rinsing system that removes starch from naturally grown rice.

Even still another object of the present invention is to provide a new rice rinsing system that makes rinsing rice an easier and quicker process.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
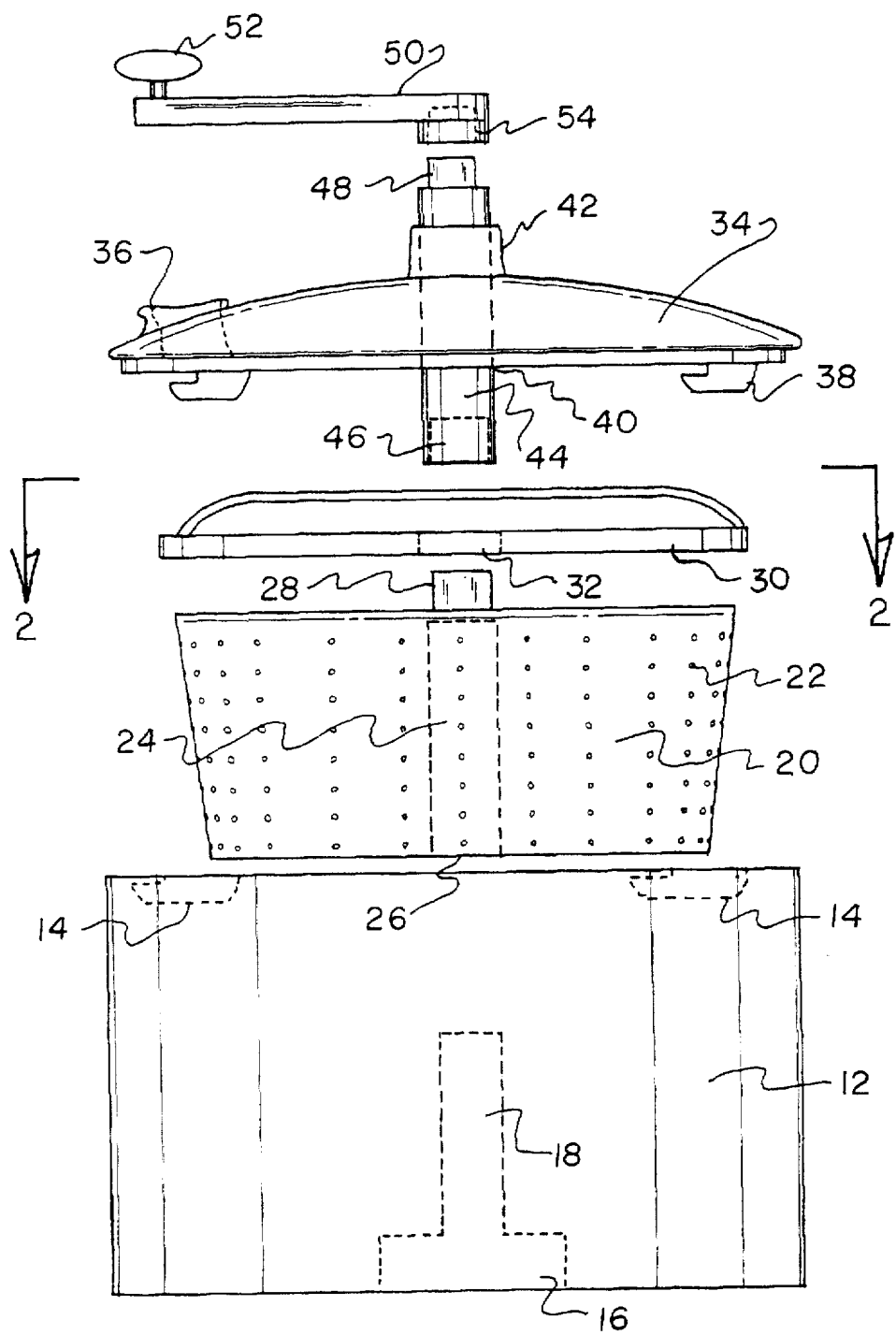
FIG. 1 is an exploded front view of a new rice rinsing system according to the present invention.
Figure 3:
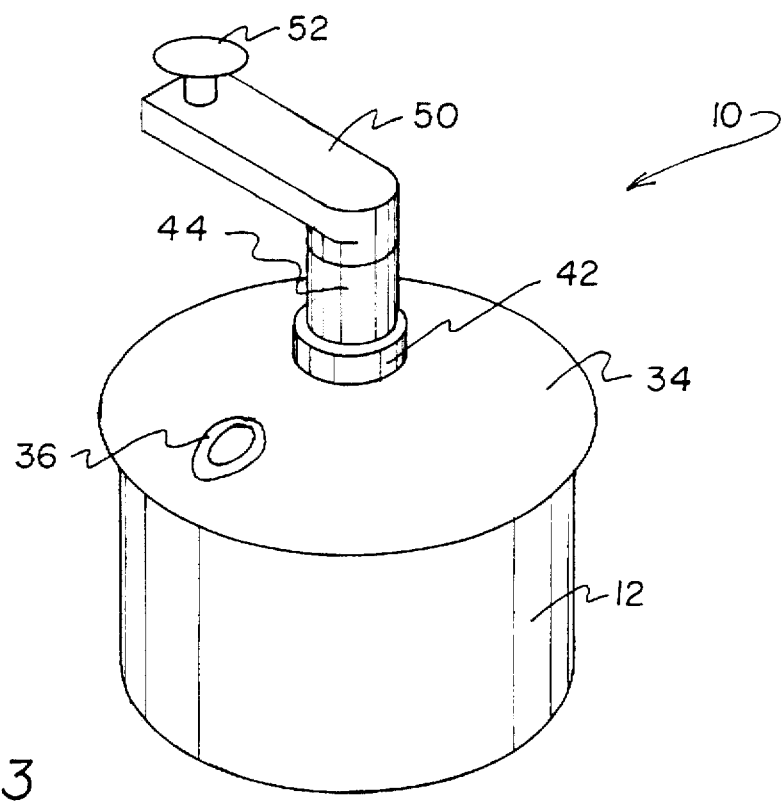
FIG. 3 is a plan perspective view of the present invention.
Figure 2:
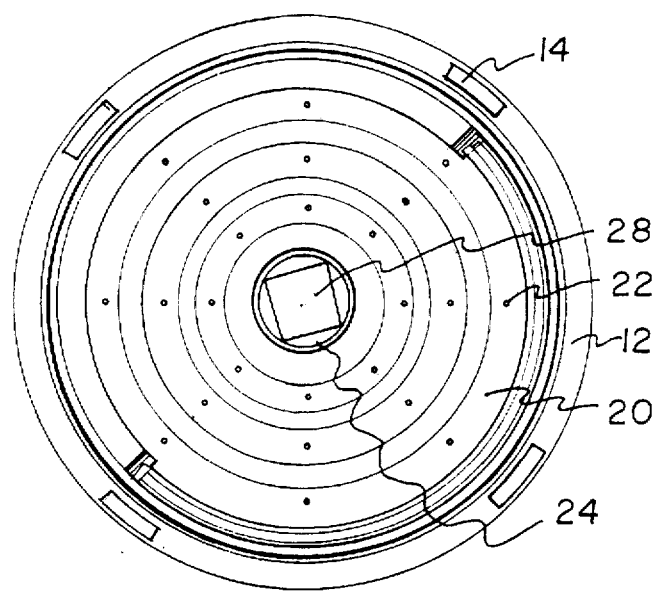
FIG. 2 is a cross-sectional view of the present invention as taken along line 2—2 of FIG. 1.

With reference now to the drawings, and in particular to FIGS. 1 through 3 thereof, a new rice rinsing system embodying the principles and concepts of the present invention and generally designated by the reference numeral 10 will be described.

As best illustrated in FIGS. 1 through 3, the rice rinsing system 10 comprises a cylindrical water bowl 12 having an open upper end, a closed lower end and a cylindrical side wall therebetween. The water bowl 12 has female receiving grooves 14 extending downwardly within the side wall from the open upper end. The closed lower end has a base 16 secured to a central portion thereof within an interior of the water bowl 12. A cylindrical shaft 18 extends upwardly from the base 16.

A cylindrical rice holder 20 is provided having an open upper end, a closed lower end and a cylindrical side wall therebetween. The closed lower end and the cylindrical side wall of the rice holder 20 are perforated 22. A hollow cylindrical sleeve 24 extends upwardly from the closed lower end of the rice holder 20. The cylindrical sleeve 24 has an open lower end 26 for receiving the cylindrical shaft 18 of the water bowl 12 therein when the rice holder 20 is positioned within the water bowl 12. An upper end of the cylindrical sleeve 24 has a lower square male fitting 28 extending upwardly therefrom.

A rice holder lid 30 is dimensioned for covering the open upper end of the rice holder 20. The rice holder lid 30 has an aperture 32 through a central portion thereof in alignment with the cylindrical sleeve 24 of the rice holder 30.

A water bowl lid 34 is dimensioned for covering the open upper end of the water bowl 12. The water bowl lid 34 has a spout 36 therethrough. The water bowl lid 34 has male fasteners 38 extending downwardly from a lower surface thereof for engaging the female receiving grooves 14 of the water bowl 12. The water bowl lid 34 has a centrally disposed aperture 40 therethrough with a cylindrical collar 42 extending upwardly therefrom. The aperture 40 is in alignment with the aperture 32 of the rice holder lid 30.

A cylindrical spindle 44 is provided having an upper end and a lower end. The lower end has a lower square female fitting 46 extending upwardly thereof. The upper end has an upper square male fitting 48 extending upwardly therefrom. The lower end of the spindle 44 is received through the centrally disposed aperture 40 of the water lid 34 and through the aperture 32 in the rice holder lid 30 with the lower square female fitting 46 engaging the lower square male fitting 28 of the rice holder 20.

An elongated handle 50 is provided having a rotatable knob 52 disposed on an upper surface of an outer end thereof. The handle 50 has an upper square female fitting 54 on a lower surface of an inner end thereof. The upper square female fitting 54 engages the upper square male fitting 48 of the cylindrical spindle 44.

In use, rice is added to the rice holder 20. The rice holder 20 is then placed in the water bowl 12. Water is then added through the spout 36 into the water bowl 12. The user then cranks the handle 50 thereby spinning the rice holder 20 with respect to the water bowl. Thus, the rice will be cleansed of its starch. The starchy water is then poured out of the water bowl 12 via the spout 36. Fresh water is then poured back into the water bowl 12 through the spout 36. The rice holder 20 and the rice are then lifted out of the water bowl 12 and can be placed directly into a pot of boiling water to be cooked.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rice rinsing system for cleaning naturally grown rice without having to get hands wet comprising, in combination:
   a cylindrical water bowl having an open upper end, a closed lower end and a cylindrical side wall therebetween, the water bowl having female receiving grooves extending downwardly within the side wall from the open upper end, the closed lower end having a base secured to a central portion thereof within an interior of the water bowl, a cylindrical shaft extending upwardly from the base;
   a cylindrical rice holder having an open upper end, a closed lower end and a cylindrical side wall therebetween, the closed lower end and the cylindrical side wall of the rice holder being perforated, a hollow cylindrical sleeve extending upwardly from the closed lower end of the rice holder, the cylindrical sleeve having an open lower end for receiving the cylindrical shaft of the water bowl therein when the rice holder is positioned within the water bowl, an upper end of the cylindrical sleeve having a lower square male fitting extending upwardly therefrom;
   a rice holder lid dimensioned for covering the open upper end of the rice holder, the rice holder lid having an aperture through a central portion thereof in alignment with the cylindrical sleeve of the rice holder;
   a water bowl lid dimensioned for covering the open upper end of the water bowl, the water bowl lid having a spout therethrough, the water bowl lid having male fasteners extending downwardly from a lower surface thereof for engaging the female receiving grooves of the water bowl, the water bowl lid having a centrally disposed aperture therethrough with a cylindrical collar extending upwardly therefrom, the aperture being in alignment with the aperture of the rice holder lid;
   a cylindrical spindle having an upper end and a lower end, the lower end having a lower square female fitting extending upwardly thereof, the upper end having an upper square male fitting extending upwardly therefrom, the lower end of the spindle being received through the centrally disposed aperture of the water lid and through the aperture in the rice holder lid with the lower square female fitting engaging the lower square male fitting of the rice holder; and
   an elongated handle having a rotatable knob disposed on an upper surface of an outer end thereof, the handle having an upper square female fitting on a lower surface of an inner end thereof, the upper square female fitting engaging the upper square male fitting of the cylindrical spindle.

2. A rice rinsing system for cleaning naturally grown rice without having to get hands wet comprising, in combination:
   a cylindrical water bowl having an open upper end, a closed lower end and a cylindrical side wall therebetween, a cylindrical shaft extending upwardly from the closed lower end;
   a cylindrical rice holder having an open upper end, a closed lower end and a cylindrical side wall therebetween, the closed lower end and the cylindrical side wall of the rice holder being perforated, a hollow cylindrical sleeve extending upwardly from the closed lower end of the rice holder, the cylindrical sleeve having an open lower end for receiving the cylindrical shaft of the water bowl therein when the rice holder is positioned within the water bowl;
   a water bowl lid dimensioned for covering the open upper end of the water bowl, the water bowl lid having a centrally disposed aperture therethrough with a cylindrical collar extending upwardly therefrom;
   a cylindrical spindle having an upper end and a lower end, the lower end of the spindle being received through the centrally disposed aperture of the water lid and engaging the cylindrical sleeve of the rice holder; and
   an elongated handle engaging the upper end of the cylindrical spindle.

3. The rice rinsing system as set forth in claim 2 and further including a rice holder lid dimensioned for covering the open upper end of the rice holder, the rice holder lid having an aperture through a central portion thereof in alignment with the cylindrical sleeve of the rice holder.

4. The rice rinsing system as set forth in claim 2 wherein the water bowl lid has male fasteners extending downwardly from a lower surface thereof for engaging female receiving grooves disposed within an upper peripheral rim of the water bowl.

5. The rice rinsing system as set forth in claim 2 wherein the water bowl lid has a spout therethrough.

6. The rice rinsing system as set forth in claim 2 wherein the elongated handle having a rotatable knob disposed on an upper surface of an outer end thereof.

\* \* \* \* \*